W. A. JAMES.
MEANS FOR STEERING A SIDE CAR ATTACHED TO A MOTOR CYCLE.
APPLICATION FILED JUNE 30, 1915. RENEWED JAN. 9, 1917.

1,223,173.

Patented Apr. 17, 1917.
2 SHEETS—SHEET 1.

Inventor.
William Arthur James,
By Wilkinson, Giusta & MacKaye.
Attorneys.

W. A. JAMES.
MEANS FOR STEERING A SIDE CAR ATTACHED TO A MOTOR CYCLE.
APPLICATION FILED JUNE 30, 1915. RENEWED JAN. 9, 1917.
1,223,173.
Patented Apr. 17, 1917.
2 SHEETS—SHEET 2.
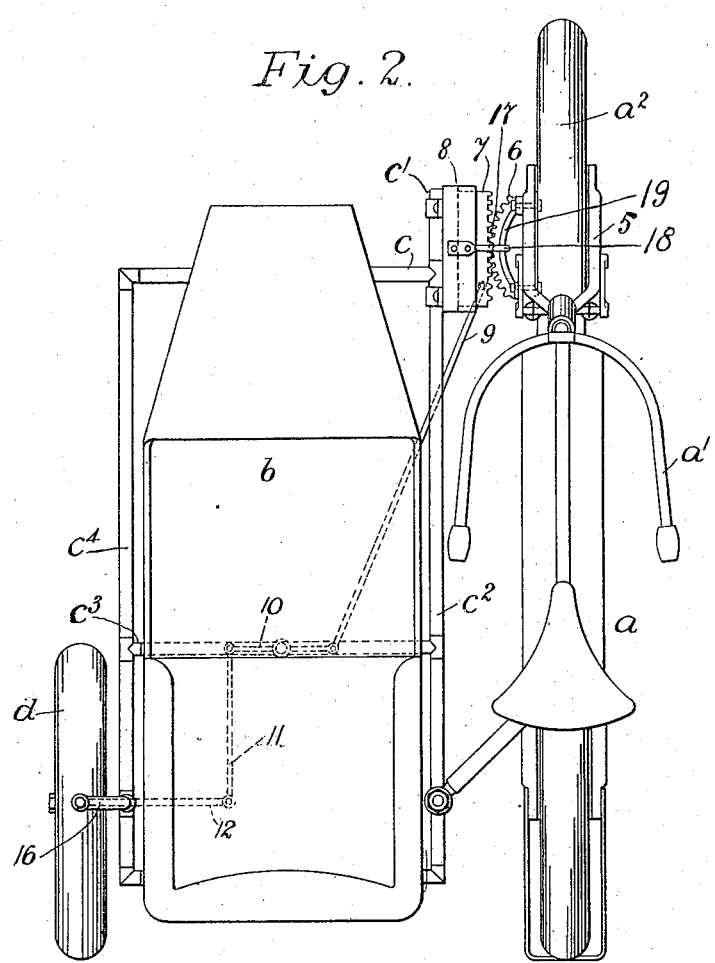
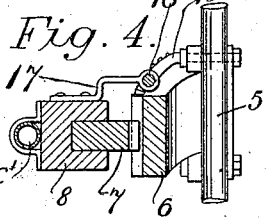
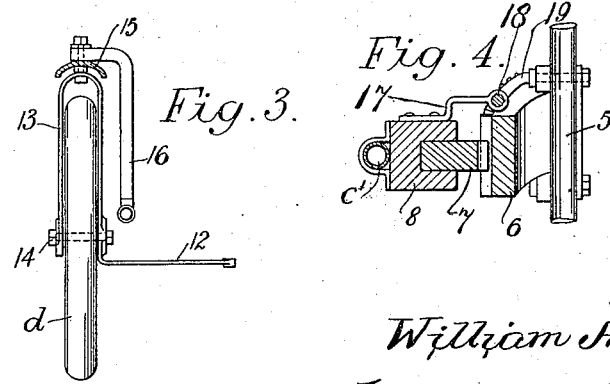
Inventor.
William Arthur James,
by Wilkinson, Gusta V Mackaye
Attorneys.

UNITED STATES PATENT OFFICE.

WILLIAM ARTHUR JAMES, OF COWBRIDGE, WALES.

MEANS FOR STEERING A SIDE CAR ATTACHED TO A MOTOR-CYCLE.

1,223,173. Specification of Letters Patent. Patented Apr. 17, 1917.

Application filed June 30, 1915, Serial No. 37,275. Renewed January 9, 1917. Serial No. 141,498.

*To all whom it may concern:*

Be it known that I, WILLIAM ARTHUR JAMES, a subject of the King of Great Britain, residing at Stafford House, Cowbridge, in the county of Glamorgan, Wales, builder, have invented a new and useful Improved Means for Steering a Side Car Attached to a Motor-Cycle, of which the following is a specification.

This invention relates to means for steering a side-car attached to a motor-cycle and has for its primary object to transmit the angular movements of the motor cycle to the wheel of the side car, thereby facilitating the turning of the car around corners.

In the accompanying drawings:—

Fig. 2 is a plan view illustrating a modified construction of the steering means.

Fig. 3 is a view showing the mounting of the wheel of the side car, and

Fig. 4 is a sectional view to an enlarged scale of the steering gear connecting the side car with the motor cycle.

Figure 1:
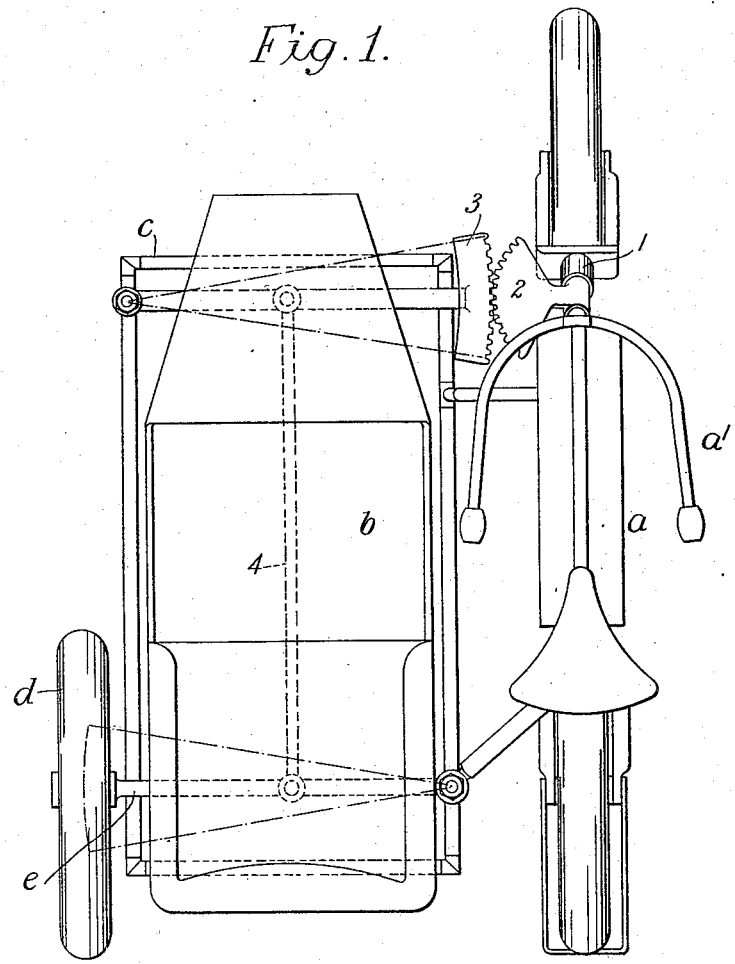
Figure 1 is a plan view of a motor cycle and side car constructed according to this invention.

Referring to the construction illustrated in Fig. 1 of the drawings, the steering pillar or fork 1 of the motor cycle $a$ is provided with a toothed segment 2 while the front portion of the side car $b$ is provided with a similar segment 3 pivoted upon the car or chassis $c$ and meshing with the segment 2 on the steering pillar or fork 1. The wheel $d$ of the side car is mounted upon one end of an axle $e$ the opposite end of which is pivoted to the side-car or chassis and the said axle is connected by a rod 4 to the toothed segment 3 at the front of the car. When the steering pillar is actuated by its handle $a'$ the angular movement thereof is transmitted through the toothed segments and the connecting rod to the axle of the side car so that the wheel of the side-car is caused to move synchronously with the front-wheel of the motor cycle. In this manner the wheel of the side-car is maintained parallel with the front wheel of the motor cycle, thus facilitating the steering of the vehicle, especially when turning corners.

According to the modification illustrated in Fig. 2 the fork 5 of the motor cycle $a$ is provided with a toothed sector 6 which meshes with a toothed rack 7 mounted to slide in a guide 8 fixed to an extension $c'$ of the side member $c^2$ of the side-car chassis $c$. The rack 7 is connected by means of a rod 9 to one arm of a lever 10 pivoted upon the transverse member $c^3$ of the chassis, while the other arm of the said lever 10 is connected by means of a rod 11 with an arm 12 which extends from a bridle 13 supported upon the axle 14 of the side-car wheel $d$. The upper end of the bridle 13 is suspended from a pivot-pin 15 mounted at the outer end of an upwardly extending and outwardly bent arm 16 provided on the outer side-member $c^4$ of the chassis $c$. To maintain the sector 6 in engagement with the rack 7 the rack-slide 8 is provided with a laterally extending arm 17 formed at its outer end with an eye 18 which works upon a curved bar 19 provided upon the toothed sector 6. The arm 17 may be rigid or may be a spring arm to afford a resilient connection between the sector 6 and the rack 7.

On moving the steering handle $a'$ of the motor cycle $a$ the sector 6 moves therewith and actuates the rack 7 forward or backward according to whether the steering handle is moved to the left or to the right hand. The actuation of the rack 7 moves through the rod 9 the lever 10 which in turn actuates through the rod 11 the arm 12 of the bridle 13 wherein the wheel $d$ of the side car $b$ is mounted; the wheel $d$ being thereby caused to move angularly with the front wheel $a^2$ of the motor cycle $a$.

What I claim as my invention and desire to secure by Letters Patent is:

1. The combination with a motor-cycle and a side-car of a toothed sector movable angularly with the steering wheel of the motor cycle, a toothed member movably mounted upon the chassis of the side car and in mesh with said sector, a wheel pivotally mounted upon the said chassis so as to be capable of angular movement and means connecting said toothed member with said wheel on the chassis for transmitting the movements of the former member to the said wheel, substantially as set forth.

2. The combination with a motor-cycle and a side-car, of a toothed sector movable angularly with the steering wheel of the motor-cycle, a rack mounted upon the chassis of the side-car and actuated by said toothed sector, a side-car wheel, a member carrying the axle of the side-car wheel, said member being pivotally mounted upon the side-car chassis, and means connecting said member carrying said wheel with said rack, substantially as set forth.

3. In a motor-cycle with side-car, the combination with a toothed segment mounted on the steering pillar of the motor-cycle, a toothed segment pivotally mounted upon the chassis of the side-car and meshing with the segment upon the said steering pillar, a wheel axle pivoted at one end upon the said chassis and a rod connecting the said axle to the toothed segment mounted upon the chassis, substantially as and for the purpose specified.

WILLIAM ARTHUR JAMES.

Copies of this patent may be obtained for five cents each, by addressing the "Commissioner of Patents, Washington, D. C."